B. CADE.
LINE COMPOSING AND CASTING MACHINE.
APPLICATION FILED DEC. 5, 1912.
1,084,395.
Patented Jan. 13, 1914.
8 SHEETS—SHEET 4.
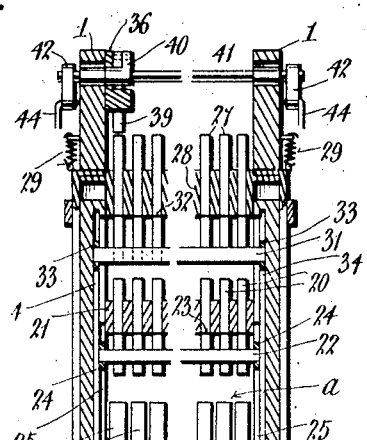
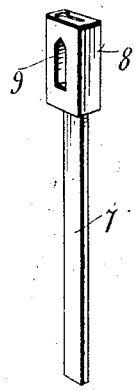
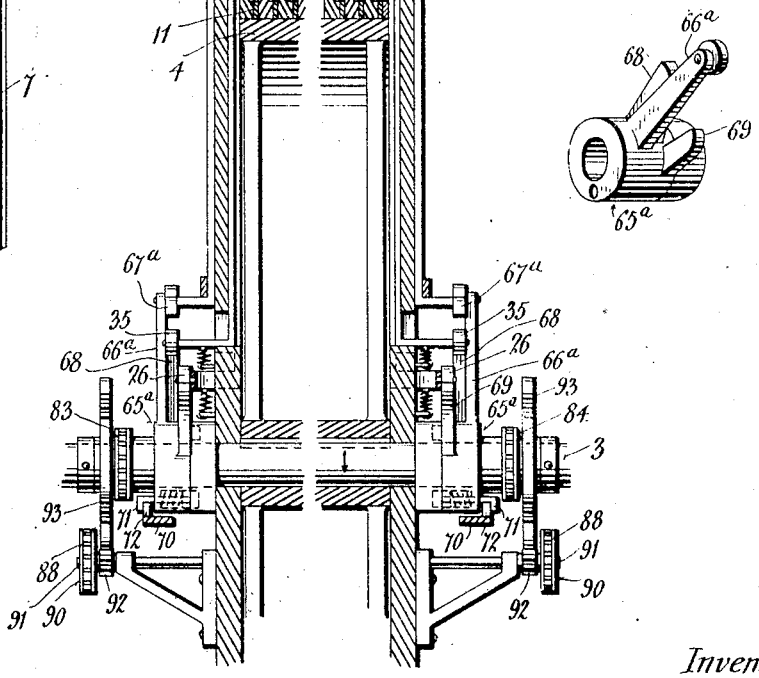
Witnesses
Inventor
Baylus Cade
by
Attorney B. CADE.
LINE COMPOSING AND CASTING MACHINE.
APPLICATION FILED DEC. 5, 1912.
1,084,395.
Patented Jan. 13, 1914.
8 SHEETS—SHEET 5.
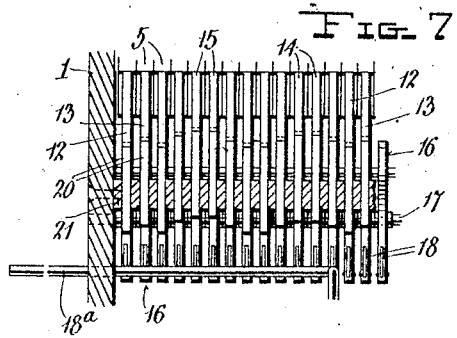
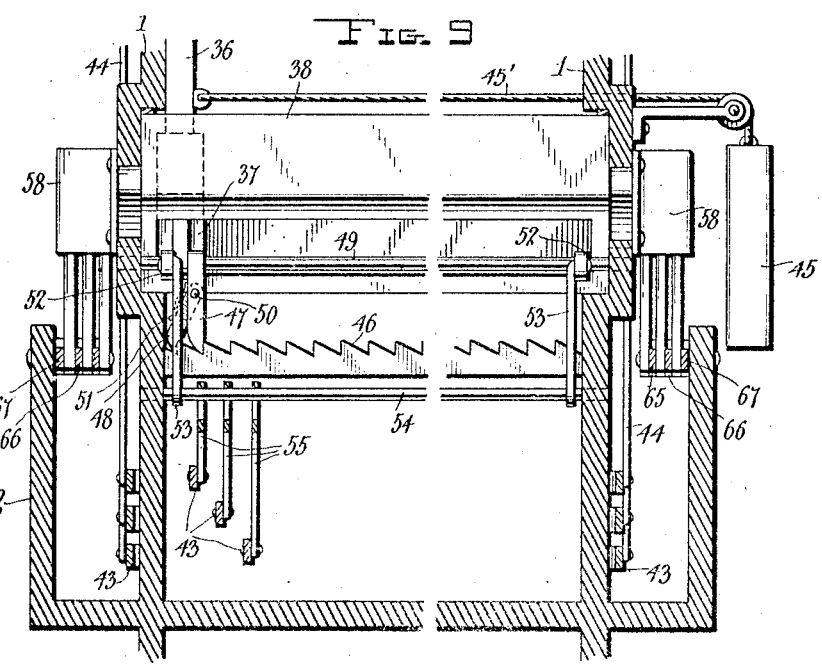
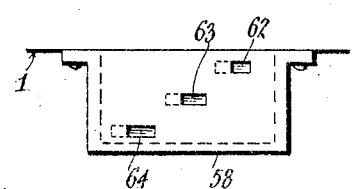
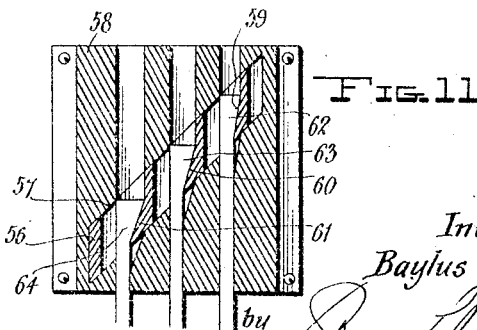
Inventor
Baylus Cade B. CADE.
LINE COMPOSING AND CASTING MACHINE.
APPLICATION FILED DEC. 5, 1912.
1,084,395.
Patented Jan. 13, 1914.
8 SHEETS—SHEET 6.
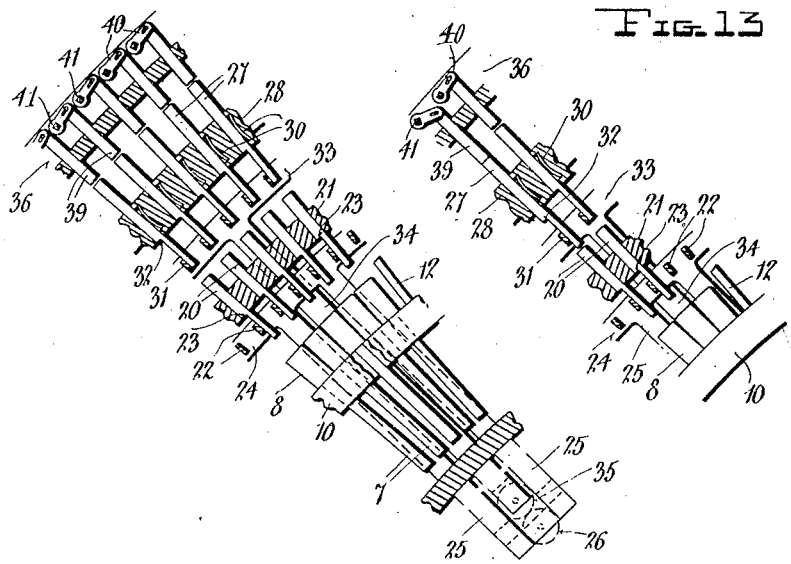
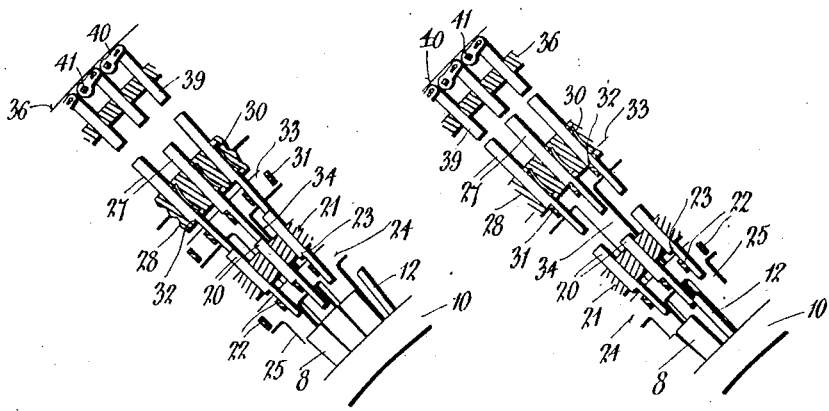
Witnesses
Inventor
Baylus Cade
Attorney B. CADE.
LINE COMPOSING AND CASTING MACHINE.
APPLICATION FILED DEC. 5, 1912.
1,084,395.
Patented Jan. 13, 1914.
8 SHEETS—SHEET 7.
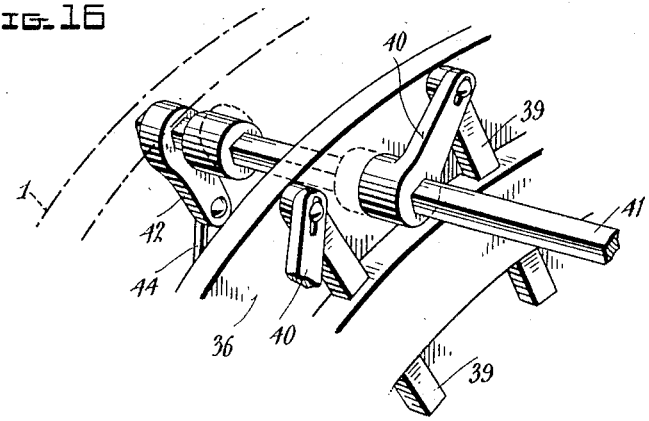
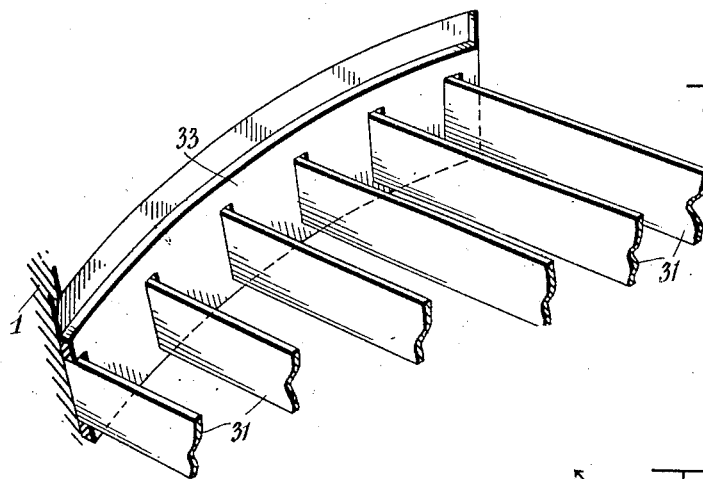
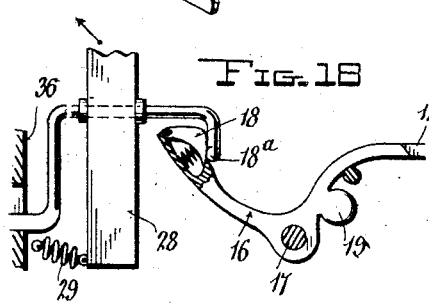
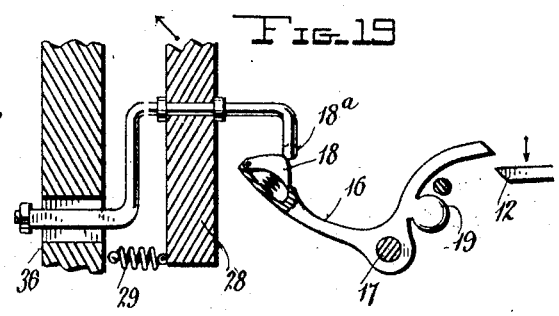
Witnesses
Inventor
Baylus Cade,
by
Attorney.

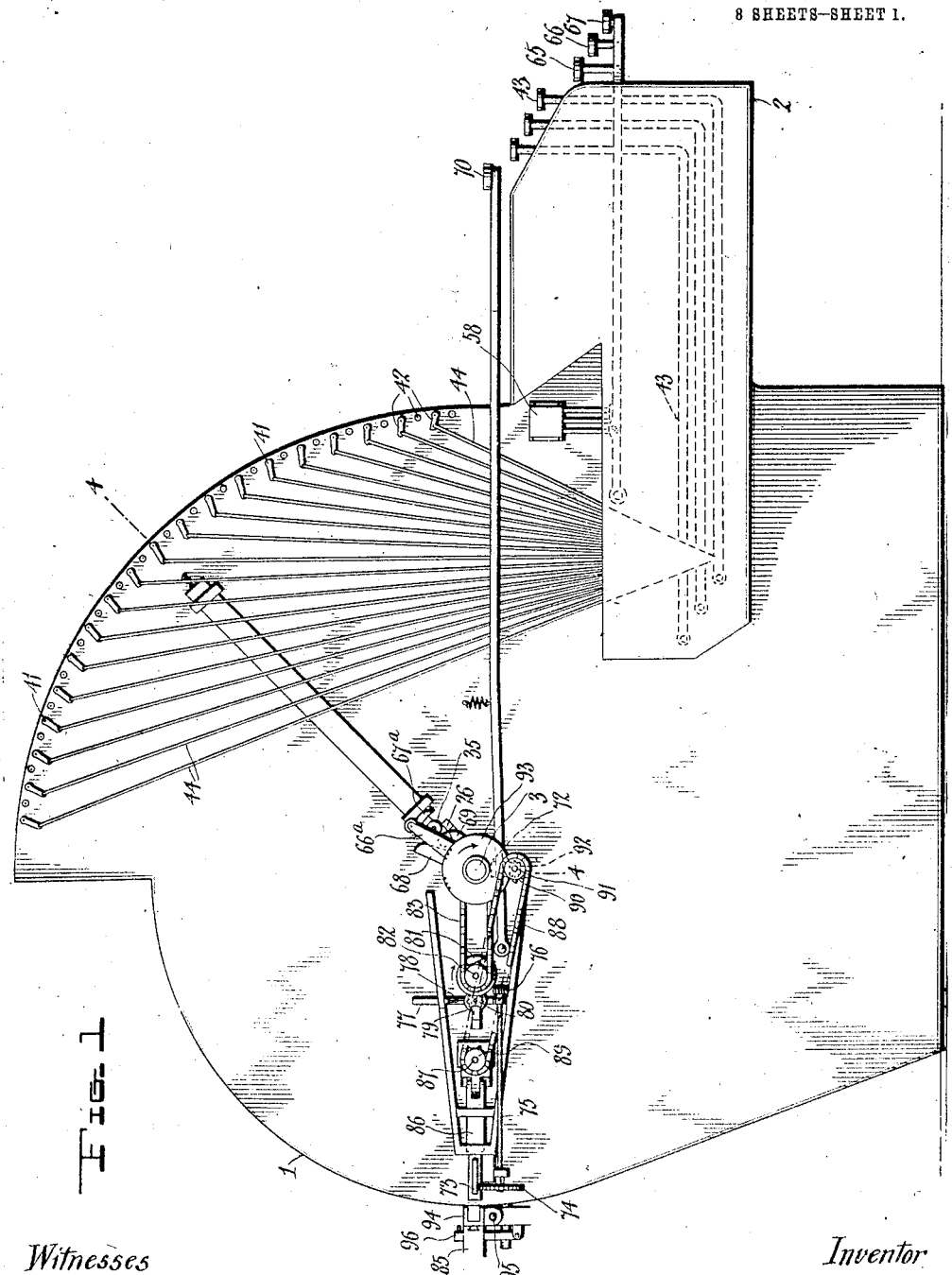

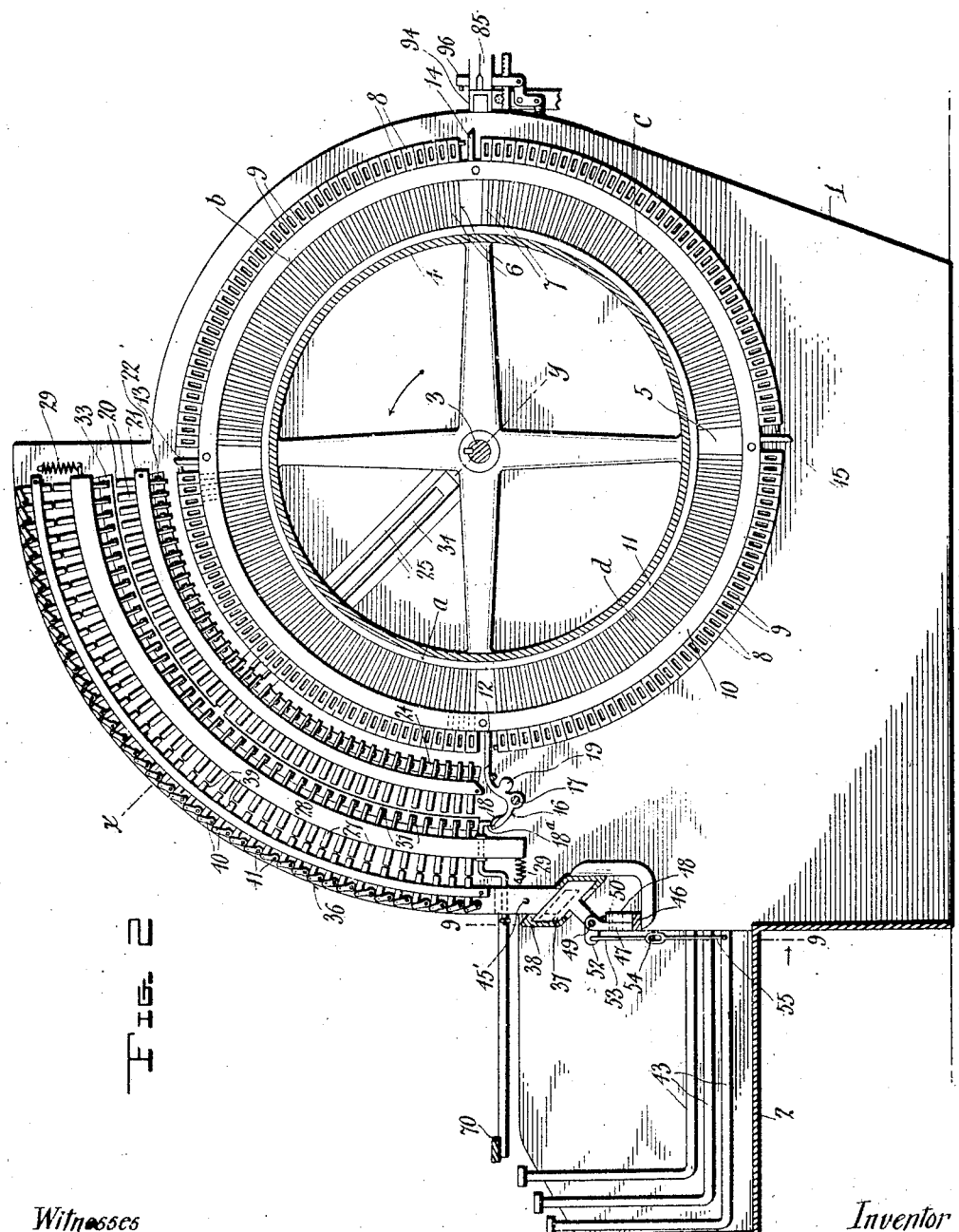

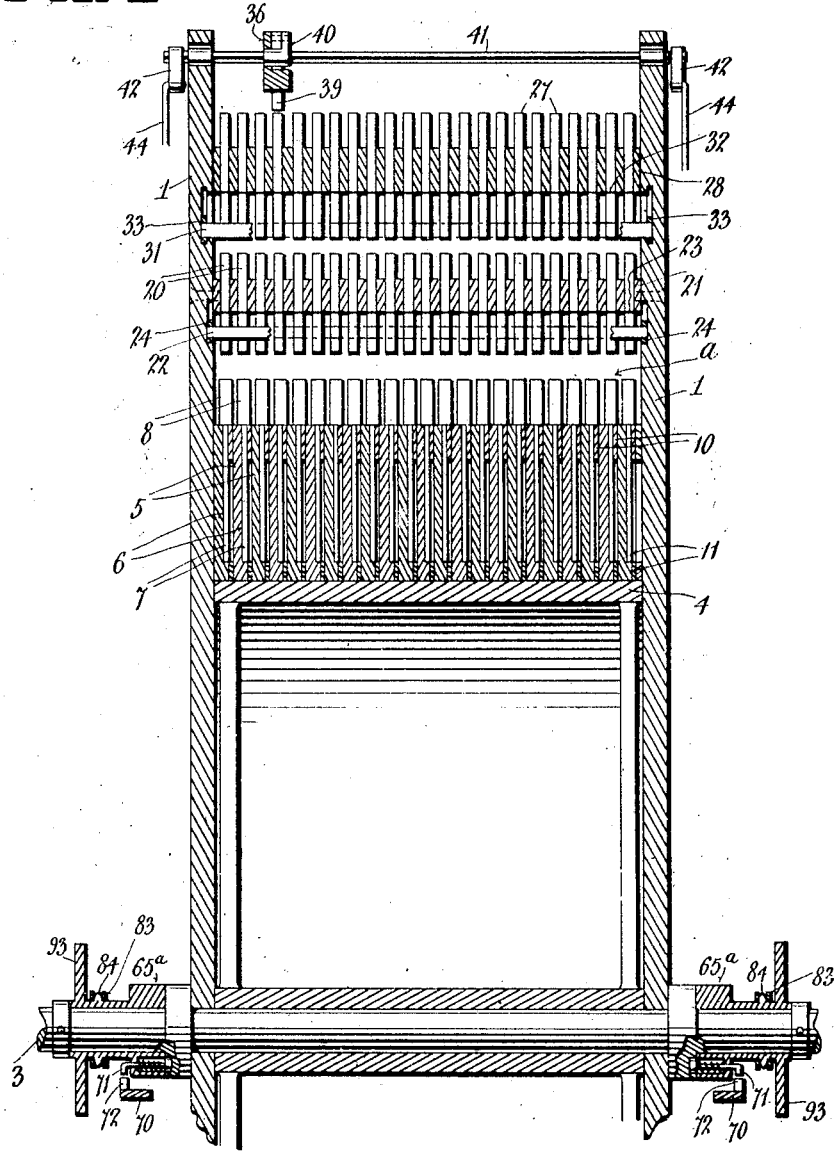

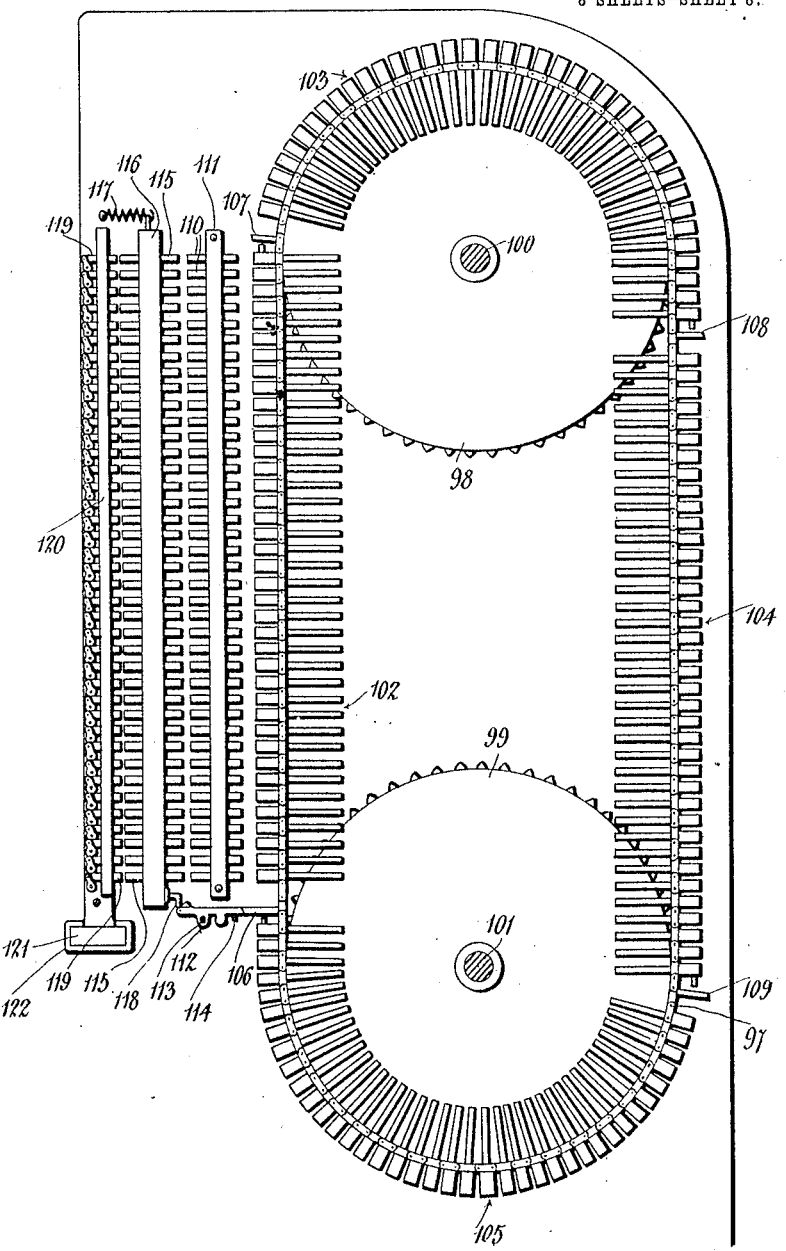

UNITED STATES PATENT OFFICE.

BAYLUS CADE, OF SHELBY, NORTH CAROLINA.

LINE COMPOSING AND CASTING MACHINE.

1,084,395.  Specification of Letters Patent.  Patented Jan. 13, 1914.

Application filed December 5, 1912. Serial No. 735,157.

*To all whom it may concern:*

Be it known that I, BAYLUS CADE, a citizen of the United States, residing at Shelby, in the county of Cleveland and State of North Carolina, have invented new and useful Improvements in Line Composing and Casting Machines, of which the following is a specification.

The present invention relates to improvements in line composing and casting machines of the type wherein the type bars or slugs are cast directly from the matrices, and the primary object of the invention is to provide a simplified and improved machine of this character which avoids the complication and expense of the matrix circulating and distributing mechanisms, the matrices according to the present invention being supported by matrix carriers which are operative to bring the matrices selected by the keyboard to the assembling, alining and casting point, the machine embodying the present invention having improved matrix selecting means which enables the keyboard to be manipulated to compose a line while a cast is being made from the previously composed line.

Another object of the invention is to provide a relatively simple and compact machine which is capable of containing at one time a plurality of fonts of matrices any one of which fonts may be readily brought into use.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 represents a side elevation of a line composing and casting machine constructed in accordance with the present invention; Fig. 2 represents a central longitudinal section of the machine shown in Fig. 1; Fig. 3 represents on an enlarged scale a transverse section of the machine as shown in Figs. 1 and 2; Fig. 4 represents on an enlarged scale a section of the machine on the line 4 of Fig. 1: Fig. 5 is a detail perspective view of one of the matrices removed from its carrier; Fig. 6 is a perspective view of one of the cam members for operating certain parts of the machine at appropriate intervals; Fig. 7 is a fragmentary sectional view of a portion of the machine showing the manner in which the setting of the matrix selecting pins is transferred to the coöperative set of stop pins; Fig. 8 is a perspective view of a portion of the stop for the matrix carriers; Fig. 9 represents an enlarged section on the line 9—9 of Fig. 2 and looking toward the right; Figs. 10 and 11 are detail views of the shift mechanism for setting the matrix selecting carriage to operate in the selection of matrices belonging to different fonts; Fig. 12 is a diagrammatic section of the matrix selecting and arresting pins with the coöperative escapement carriage and matrix carrier, the parts in this figure being shown in normal position; Fig. 13 is a view similar to Fig. 12 showing one of the matrix selecting pins, however, in actuated position; Fig. 14 is a diagrammatic view showing the frame for the matrix selecting pins in shifted position and the matrix arresting pins in correspondingly set position; Fig. 15 shows diagrammatically the matrix selecting pins in reset and restored position, and one of the actuated matrix arresting pins coöperative with the stop to position the selected matrix at the assembling point; Fig. 16 is a perspective view of a portion of the escapement carriage showing certain details thereof; Fig. 17 is a perspective view of a side member of one of the resetting mechanisms; Figs. 18 and 19 are detail diagrammatic views showing the mode of operation of the member 18ª in releasing the matrix carriers; Fig. 20 is a diagrammatic view showing a modified construction adapted to be used in connection with matrix carriers in the form of endless chains or belts.

Similar parts are designated by the same reference characters in the several views.

One embodiment of the invention is shown in the accompanying drawings and will be hereinafter described in detail, but it is to be understood that this embodiment of the invention is shown and described as an example of one form of the invention by the aid of which the principles thereof will be explained, and that equivalent constructions may be used to carry out the principles and to produce the results of the invention without in the scope of the claims at the end of the specification.

In the present instance, the machine embodies a suitable casing or frame comprising side members 1 and the supplemental section 2, the latter containing or serving as a support for the keyboard mechanism. A continuously revolving shaft 3 is mounted in the side members 1 and its ends project beyond the respective sides of the casing. A cylindrical drum 4 is keyed or otherwise fixed to the shaft 3 and hence revolves continuously therewith. This continuously revolving drum 4 serves to move the matrices to the assembling point after the composing of the line has been completed, and to restore the matrices to initial or normal position after a cast has been made from the previously assembled matrices. In that form of the invention shown in Figs. 1 to 4 inclusive, a series of concentric axially alined matrix carriers 5 are provided which coöperate frictionally with the periphery of the drum 4 whereby the latter may rotate these carriers and thereby bring the selected matrices to the assembling point. These matrix carriers 5 are assembled in axially spaced relation on the periphery of the drum and between the side members 1 of the casing or frame, each matrix carrier embodying substantially a ring formed with a suitable number of radially arranged slots 6 to slidably receive the stems 7 to which the matrices 8 are fixed, the matrices projecting in radial relation from the periphery of each matrix carrying ring and the selected matrices are capable of being projected beyond the remaining matrices on the respective matrix carrying rings when the line of matrices is presented to the mold. In order to provide for the projection or extension of the selected matrices beyond the remaining matrices on the respective carriers, each matrix is provided with an aperture 9 which extends through the body thereof and is adapted to receive an alining and shifting bar as will be hereinafter described. A retaining ring 10 may be provided to retain the various matrix stems 7 in proper relation with their respective matrix carriers, and rings 11 may be interposed between the matrix carriers adjacent to their inner circumferences for the purpose of maintaining the carriers in proper spaced relation. In the preferred embodiment of the invention, each matrix carrier bears matrices belonging to a plurality of fonts. For example, in the present instance, each matrix carrier is divided into four sections $a$, $b$, $c$, and $d$, these sections containing four fonts of matrices. Each matrix carrying ring is also provided with a set of arresting stops 12, 13, 14 and 15, such stops corresponding to and being used in connection with the respective sets or fonts of matrices. Under normal conditions, the matrix carriers are held from rotation, notwithstanding the frictional driving action produced thereon by the continuous rotation of the drum 4, by a series of stops 16, one for each matrix carrier, the stops shown being pivoted on the shaft 17, each stop having a spring pressed latch 18, the stops being adapted to arrest the matrix carriers in a predetermined position, with all of the matrices bearing like characters in alinement. The stops 16, however, are adapted to coöperate only with the stops 12 of the respective matrix carriers, the stops 13, 14 and 15 being capable of passing the stop 16 freely or without coöperating therewith, and to produce this result, as well as to enable the keyboard to be set so as to select matrices from any one of the different fonts, the stops 12, 13, 14 and 15 are of graduated lengths, the stop 13 for instance being the shortest, the stop 14 being longer than the stop 13, the stop 15 being longer than the stop 14, and the stop 12 being longer than the stop 15, the stops 16 being so adjusted that when they are operated to release the stops 12 of the different matrix carriers, the latter may complete a full revolution before they are again arrested by the engagement of the stops 16 with the stops 12 thereon. A weight 19 is provided which serves to move each stop 16 into operative position and to retain it in such position.

The arresting of the different matrix carriers to position the selected matrices thereof at the assembling point is accomplished by sets of stop pins which are controlled by the keyboard and coöperate with any one of the stops 12, 13, 14 or 15, according to which set or font of matrices is in use. In the construction shown, a set of stop pins 20 is provided for each matrix carrier, these stop pins corresponding in number and arrangement to the number and arrangement of each set of matrices on the respective matrix carrier, the pins in the present instance being arranged radially with the shaft 3 as an axis and they are guided and supported by a segmental frame 21, the ends of this frame being supported and guided by the side members 1 of the casing of the machine, the frame 21 being movable in substantially the direction indicated by the line $x$—$y$ of Fig. 2. These pins 20 are individually movable longitudinally in the frame 21 and normally all of these pins are retracted and will clear the stop pins 12, 13, 14 and 15 of the respective matrix carriers, although when any one of the pins 20 is actuated or moved toward the shaft 3, it will assume a position in the path of one of the stops on the respective matrix carrier, thereby arresting the movement of this particular matrix carrier at the point where the selected matrix thereon will be presented to the assembling point. After each line of matrices has been assembled, such pins 20 as were previously actuated are restored in order to avoid interference with the next assembling operation. In the construction shown, a set of restoring bars 22 are provided, these bars coöperating with shoulders 23 which are formed by notching or cutting away the operative ends of the pins 20, and the restoring bars 22 are actuated by segmental side members 24 having stems 25 which are guided to operate between the respective side members of the frame and are provided with rollers 26. In Figs. 12 and 13, the pins 20 are in normal position, while in Figs. 14 and 15 one of these pins is shown in actuated position and one of the pins is shown engaged by the arresting stop on the corresponding matrix carrier.

The arresting pins 20 are set from the keyboard through the medium of a set of selecting pins 27, these selecting pins being grouped in sets, one for each set of arresting pins 20, and they are arranged radially and in alinement with the respective sets of pins 20. These selecting pins 27 are carried by a frame 28 and they are so mounted that they may be shifted individually and in a longitudinal direction with respect to this frame, and they also may be shifted bodily with the frame 28, the present construction contemplating a setting of the pins 27 from the keyboard during the composition of the line, and a transfer of the setting from the pins 27 to the arresting pins 20, this operation being effected by shifting the frame 28 bodily toward the frame 21, thereby bringing the pins 27 into coöperative relation with the pins 20, and such pins 27 as have been actuated will cause actuation of the respective pins 20 as shown in Figs. 13 and 14, the remaining pins being unaffected by this shifting operation. For this purpose the shiftable frame 28 is guided by the side members 1 of the main casing so as to move in the direction indicated by the line x—y of Fig. 2, and springs 29 may be employed to normally retain the frame 28 in retracted position. In order that the setting of the pins 27 of the shiftable frame 28 may be transferred to the pins 20, suitable means is employed for retaining the pins 27 in set position with sufficient force to enable them to actuate the pins 20 when the frame 28 is shifted, friction springs 30 being shown for this purpose in the present instance. A set of resetting bars 31 is also provided for the pins 27, these resetting bars coöperating with the shoulders 32 of the respective pins, and the resetting bars 31 are actuated by side frames 33, the latter having radial extensions 34 which are movable in the direction indicated by the line x—y in Fig. 2 and they are equipped with actuating rollers 35.

The controlling stops 16 are preferably released by the frame 28, as the latter moves away from the frame 21 after transferring the setting of the pins 27 to the pins 20. For this purpose, a stop releasing bar 18ª is attached to and travels with the movable composing carriage, this bar being also connected to the frame 28 whereby it will shift therewith and pass the latches 18 when moving toward the right, leaving the stop undisturbed, and when the frame 28 shifts toward the left, the bar 18ª will coöperate with the latch and release the stop, as shown diagrammatically in Figs. 18 and 19. As this bar 18ª travels with the carriage, it will release only so many of the stops as correspond to the number of matrix carriers used in composing each line of matrices. The bar 18ª may be arranged in different ways whereby it will travel with the composing carriage as the latter moves from one matrix carrier to another and releases the controlling stops 16. In the construction shown, the shank of the bar 18ª has a limited play vertically in a slot in the body of the carriage, and this shank is slidable horizontally in a slot formed in the carrier 28, as shown in Figs. 18 and 19. The vertical play of the shank of the bar 18ª in the vertical slot in the carriage 36 permits the carrier 28 to shift diagonally or in the direction indicated by the arrows in Figs. 18 and 19, although maintaining such a connection between the carriage 36 and the bar 18ª as to shift the bar 18ª horizontally with the composing carriage as the composition of a line progresses. This bar 18ª, as shown in Fig. 7, has a straight horizontally extending portion which is drawn over the stops 16 by the composing carriage as the latter travels toward the right, the left-hand portion of the bar 18ª working freely through an opening in the left-hand side of the machine when the composing carriage is in normal position before commencing the composition of a line.

The selecting pins 27 are set in composing the line of matrices by a traveling carriage which is positioned successively in coöperative relation with each set of these pins 27. In the construction shown, a carriage 36 is provided which is guided to reciprocate in a direction axially of the shaft 3, this carriage in the present instance having a base 37 which coöperates with a guide 38, the latter extending parallel to the shaft 3 whereby movement of the carriage in a direction axially of this shaft is produced. The carriage supports a set of plungers 39 which correspond in number and arrangement to the pins 27 of each set, these plungers being guided to reciprocate radially with respect to the carriage and each plunger is provided with an actuating arm 40 which has a spline connection with a corresponding operating shaft 41. The different shafts 41 are rotatably mounted in the respective side members 1 of the machine casing and are provided with arms 42 which are operatively connected to the respective key levers 43 by the wires 44 whereby depression of any key of the keyboard will cause rotation of its corresponding shaft 41 and such shaft will rock its respective arm 40 to push inwardly its respective plunger 39, and this operation will take place irrespective of the position of the carriage owing to the spline connection between the shafts 41 and the different plungers. As each plunger 39 is pushed inwardly, it actuates its corresponding matrix selecting plunger 27 and the setting of the plungers 27 is transferred to the plungers 20 in the manner hereinbefore described.

Suitable means is provided whereby the carriage will receive a step-by-step movement, moving from one set of matrix selecting pins 27 to the next adjacent set. In the present instance, a cord or cable 45' is attached to the carriage and provided with a weight 45 which acts to feed the carriage automatically toward the right as the composition of the line progresses. This traversing movement of the carriage, however, is controlled by a suitable escapement mechanism, that shown embodying a rack 46 which is suitably supported by the machine and coöperates alternately with a pair of escapement dogs 47 and 48, the dog 47 being pivoted to the base 37 of the carriage by the pin 49, while the dog 48 is pivoted in superposed relation to the dog 47 by the pin 50, and a spring 51 serves to return the pivoted dog 48 to operative position after each actuation of the escapement. The dogs 47 and 48 are rotated about the pin 49 each time a key of the keyboard is actuated, a pair of operating arms 52 being provided for the escapement which are connected by the links 53 to a bail 54 and the latter coöperates with the slotted links 55 which are attached to the different key levers 43. By this arrangement, the carriage will shift one space, that is to say, from one set of matrix selecting pins 27 to the next adjacent set of pins 27, after the keyboard is operated for the selection of each matrix.

To enable the same keyboard to be used in selecting composing matrices from any one of the fonts in the machine, the carriage is shiftable in a manner which enables the keyboard to push the plungers 39 inwardly different distances whereby the arresting pins 20 will coöperate with the appropriate stop 12, 13, 14 or 15 as the case may be. In the present instance, the guide 38 for the carriage is shiftable in a direction parallel to the line x—y of Fig. 2, the ends of this guide being formed as slides 56, which operate in the diagonal slots 57 formed in a pair of brackets 58 which latter are fixed to the opposite sides of the casing of the machine, the slides 56 being formed with a set of three wedge surfaces 59, 60 and 61 of varying widths, and a corresponding set of wedges 62, 63 and 64 are arranged to coöperate with these wedge surfaces, these wedges being of graduated widths. These wedges are connected to the keys 65, 66 and 67, and by depressing any one of these keys, the corresponding wedge will be drawn downwardly, thereby causing the guide 38 of the carriage to be shifted diagonally and thereby adjusting the distance between the carriage and the matrix selecting pins 27. By adjusting the carriage in this manner, the effective strokes of the plungers 39 are adjusted and as the arresting pins 20 are shifted through different distances determined by different degrees, the pins 27 are shifted, so it is obvious that the pins 20 will coöperate with the particular stop on the matrix carrier corresponding to the font in use. For example, when the carriage is adjusted nearest to the pins 27, the pins 20 will have the maximum movements and these pins will therefore coöperate with the stop pins 13, and when the carriage is adjusted at its greatest distance from the pins 27, the latter will have the shortest strokes and hence the pins 20 will be extended to the minimum distance and these pins will then permit the stops 12, 13 and 14 to pass them but will coöperate with the longest arresting stops 12 on the matrix carriers. Intermediate positions of the carriage 36 will cause the pins 20 to coöperate with the pins 14 and 15 of intermediate length.

Different means may be provided for shifting the frame 28 to transfer the setting of the pins 27 to the pins 20 and to actuate the resetting bars 22 and 31. In the present instance, a clutch 65ᵃ is provided on the shaft 3 and at each side of the machine casing, this clutch bearing an arm 66ᵃ which is adapted to coöperate with a cam 67ᵃ which is attached to the frame 28, the arm 66ᵃ operating to draw the frame 28 inwardly or toward the shaft 3, once during each revolution of the clutch. The clutch member also bears a cam 68 which is adapted to coöperate with the roller 35 attached to the resetting frame 33, the cam 68 operating once during each revolution of the clutch to move the frame 33 from the shaft 3 whereby the resetting bars 31 are caused to abut against the shoulders 32 of the pins 27, thereby restoring these pins to normal position with respect to the frame 28. The clutch member also bears a cam 69 which is arranged to coöperate with the roller 26, the latter being attached to the resetting frame 21 for the pins 20, this cam 69 operating once during each revolution of the clutch to move the resetting bars 22 into engagement with the shoulders 23 of the pins 20, thereby restoring the latter to initial position. This clutch may be controlled by a key lever 70 adjacent to the keyboard, the motion of the clutch being automatically interrupted after it has completed one revolution and performed its cycle of operations by any suitable clutch-disengaging device, that shown embodying a stop pin 71 carried by the clutch and arranged to coöperate with a stationary throw-off wedge 72.

The means for assembling and alining the matrices and for moving them to the casting point may be of any suitable construction, that shown corresponding substantially with that disclosed fully in Letters Patent No. 1,035,416 granted August 13, 1912, it embodying briefly an assembling and alining bar 73 which is movable transversely of the line of assembled matrices and extends through the apertures 9 therein, this bar being moved through the apertures in the alined matrices by the gear 74 fixed to the shaft 75, the latter bearing a pinion 76 which coöperates with a reciprocating rack 77, the latter being connected by a pitman 78 to a crank 79 and the latter being connected by the mutilated gears 80 and 81 to the shaft 82, the latter being connected by the sprocket chain 83 to the sprocket wheel 84, the latter being attached to and controlled in its operation by the clutch 65ᵃ. The line of composed and assembled matrices are alined by the alining bar 73 and are then drawn outwardly with respect to their carriers by movement of the alining bar toward the mold 85, such movement of the alining bar being produced by the members 86 acting on the opposite ends thereof, these members being periodically reciprocated by crank shafts 87, and these crank shafts are rotated at intervals by a sprocket chain 88 coöperative with a sprocket wheel 89 on each end of the shaft, the sprocket chain coöperating with a sprocket wheel 90 fixed to a countershaft 91, the latter having a mutilated gear 92 fixed thereon which coöperates with a mutilated gear 93 on the clutch member 65ᵃ. After the line of composed and assembled matrices has been shifted toward the mold by the alining bar 73, the line is brought to the required length by the approaching movement of the vise jaws 94 which are operated by a screw 95 which connects them and the member 96 then operates to expand the wedge spacers in the line. The mechanism just described and which serves to aline the composed matrices, to shift the alined matrices into coöperative relation with the mold, to bring the line of matrices to the required length, and to expand the wedges, is fully disclosed in Letters Patent aforesaid and further illustration and description thereof in the present application is deemed unnecessary.

Instead of mounting the matrices on circular carriers as previously described, these matrices may be mounted on carriers in the form of endless chains or belts, Fig. 20 showing such an arrangement, wherein sprocket chains 97 are employed, these sprocket chains passing over a pair of spaced sprocket wheels 98 and 99 and these sprocket chains are rotated in an anti-clockwise direction by the shafts 100 and 101. Four sets of matrices 102, 103, 104 and 105 are carried by each chain and each chain is also provided with a set of four stops 106, 107, 108 and 109, these stops being of graduated lengths and are adapted to coöperate with the arresting pins 110, the latter in the present instance being arranged in a rectilinear direction and are supported by a suitable frame 111. The longest stop 106 is arranged to coöperate with a catch 112, the latter being pivoted at 113 and having an arresting rail 114 thereon. The arresting pins 110 are set by the matrix selecting pins 115, the latter being in this instance also arranged in a straight line and they are movably mounted in a shiftable frame 116, the latter being held normally in retracted position by springs 117, and the frame 116 has an extension 118 to coöperate with the catch 112 to disengage the rail 114 thereof from the stop 106 when the frame 116, together with the pins 115, is shifted into coöperative relation with the arresting pins 110. The matrix selecting pins 115 are set from the keyboard through the medium of the plungers 119 carried by a carriage 120, the latter having a base 121 which coöperates with a guide 122.

The operation of a line composing and casting machine constructed in accordance with the present invention may be briefly described as follows: Normally, the parts occupy the position shown in Fig. 2, the drum 4 revolving continuously in the direction indicated by the arrow while the matrix carriers are prevented from rotating with the drum 4 by reason of the engagement of the stop 16 with the stop 12 on the different matrix carriers. Manipulation of the keyboard will cause the plungers 39 of the movable carriage to successively actuate the matrix selecting pins 27, the carriage moving from one row of matrix selecting pins to the next row thereof after one pin in each row has been actuated. When a line has been composed, manipulation of the keyboard is interrupted and the clutch member 65ᵃ is set into operation by manipulation of the key 70. This clutch member will then operate to shift the frame 28 carrying the pins 27 toward the frame 21 bearing the pins 20, the frame 28 shifting in the direction indicated by the line x—y of Fig. 2. As the pins 27 are held in the positions in which they have been set by the plungers 39, movement of the frame 28 toward the frame 21 will cause those pins which have been actuated to actuate the corresponding pins 20, causing such pins to project into the path of the appropriate stop on the respective matrix carrier. The movement of the frame 28 in a direction away from the frame 21 causes the stop 16 to disengage from the stops 12 on the various matrix carriers, and the latter are then caused to rotate by reason of their frictional engagement with the drum 4, and these matrix carriers will rotate until the respective stops thereon have encountered the actuated pins 20, whereupon the rotation of the matrix carriers will be arrested. This operation serves to bring the selected matrices to the assembling point adjacent to the mold. The frame, together with the pins 27, may then be restored and the pins 20 and 27 reset, thereby enabling the keyboard to be manipulated to compose another line while the previously composed line is being alined and brought to the mold before the casting operation. Continued operation of the clutch member 65ᵃ causes the alining bar 73 to enter the assembled line of matrices and then to shift the assembled line of matrices into coöperative relation with the mold, the vise jaws then closing to gage the length of the line, and the spacers in the line are then expanded after which the cast can be made in the well known manner, and after the clutch member 65ᵃ has completed a revolution, its rotation is automatically interrupted.

I claim as my invention:—

1. In a machine of the class described, the combination of a plurality of matrix carriers bearing sets of matrices, matrix selecting mechanism coöperative therewith embodying a set of arresting pins for each matrix carrier and means for simultaneously setting the pins for the different carriers in arresting position, and means coöperative with the matrix carriers for moving the matrices thereon to and from the assembling point.

2. In a line composing and casting machine, the combination of matrix selecting mechanism embodying a plurality of sets of arresting pins and means for setting pins of the different sets simultaneously, a set of matrix carriers, means tending to move the matrix carriers past the selecting mechanism, and means for holding the matrix carriers in coöperative relation with the selecting mechanism.

3. In a line composing and casting machine, the combination of matrix selecting mechanism embodying a plurality of sets of arresting pins and means for setting pins of the different sets simultaneously, a plurality of matrix carriers, means acting on the matrix carriers to carry them past the selecting mechanism, and stop mechanism for positioning the matrix carriers in coöperative relation with the selecting mechanism.

4. In a line composing and casting machine, the combination of matrix selecting mechanism embodying a plurality of sets of arresting pins and means for setting pins of the different sets simultaneously, a plurality of matrix carriers, means acting on the matrix carriers to carry the matrices past the assembling point, means for positioning the matrix carriers in coöperative relation with the selecting mechanism, and means for arresting the movement of the matrix carriers under the control of the selecting mechanism and with the selected matrices at the assembling point.

5. In a line composing and casting machine, the combination of matrix selecting mechanism, a set of matrix carriers, the selecting mechanism being shiftable bodily toward and from the matrix carriers, means on the matrix carriers to impart a circulating movement thereto, means for arresting the movement of the matrix carriers in coöperative relation with the selecting mechanism, and means controlled by the shifting movement of the selecting mechanism for positioning the selected matrices at the assembling point.

6. In a line composing and casting machine, the combination of matrix selecting mechanism, a plurality of matrix carriers, the selecting mechanism being shiftable toward and from the matrix carriers, means acting frictionally on the matrix carriers to impart a circulating movement thereto, and means controlled according to the position of the selecting mechanism for holding the matrix carriers in coöperative relation with the selecting mechanism.

7. In a line composing and casting machine, the combination of matrix selecting mechanism embodying sets of arresting pins and means for simultaneously setting pins of the different sets, a set of carriers bearing matrices, means tending constantly to impart a circulating movement to the matrix carriers, means for holding the matrix carriers in coöperative relation with the selecting mechanism, and means on the carriers coöperative with the arresting pins of the selecting mechanism for positioning the selected matrices at the assembling point.

8. In a line composing and casting machine, the combination of matrix selecting mechanism embodying arresting pins, a plurality of matrix carriers, each bearing a stop to coöperate with said pins, means for imparting a circulating movement to the matrix carriers, and means controlled by the matrix selecting mechanism for positioning the matrix carriers in coöperative relation with the selecting mechanism.

9. In a machine of the class described, the combination of matrix selecting mechanism embodying arresting pins, matrix carriers each bearing a stop coöperative with said pins, means tending to impart a circulating movement to said carriers, and means releasable by the matrix selecting mechanism for retaining the matrix carriers in coöperative relation with the selecting mechanism.

10. In a machine of the class described, the combination of a plurality of matrix carriers, a plurality of sets of arresting pins adapted to coöperate with said carriers to position the selected matrices thereon at the assembling point, keyboard mechanism, and matrix selecting pins coöperative with said arresting pins to simultaneously set arresting pins of the different sets according to the setting of the selecting pins.

11. In a machine of the class described, the combination of a plurality of matrix carriers, a plurality of sets of arresting pins coöperative therewith to position the selected matrices on the carriers at the assembling point, keyboard mechanism, and matrix selecting pins adapted to be set by the keyboard to select the matrices and coöperative with the arresting pins to simultaneously position arresting pins of different sets accordingly.

12. In a machine of the class described, the combination of a plurality of matrix carriers, arresting pins coöperative therewith to position selected matrices on the carriers at the assembling point, keyboard mechanism, and matrix selecting pins adapted to be set by the keyboard to select the matrices and shiftable bodily into coöperative relation with the arresting pins to simultaneously set the latter accordingly.

13. In a machine of the class described, the combination of a plurality of matrix carriers, arresting pins coöperative therewith to position selected matrices on the carriers at the assembling point, keyboard mechanism, matrix selecting pins adapted to be set by the keyboard according to the selection of matrices, means for shifting the selecting pins at one operation into coöperative relation with the arresting pins to set the latter accordingly, and means for restoring the selecting pins to permit subsequent setting thereof by the keyboard.

14. In a machine of the class described, the combination of a plurality of matrix carriers, arresting pins adapted to coöperate with said carriers to position the selected matrices thereon at the assembling point, keyboard mechanism, matrix selecting pins adapted to be set by the keyboard according to the selection of the matrices, means for moving the matrix selecting pins after being set by the keyboard into coöperative relation with the arresting pins to simultaneously set the latter accordingly, and means for restoring the arresting and selecting pins.

15. In a machine of the class described, the combination of a plurality of matrix carriers, means tending to impart a circulating movement thereto, arresting pins adapted to coöperate with said carriers to position the selected matrices thereon at the assembling point, keyboard mechanism, matrix selecting pins adapted to be set by the keyboard according to the selection of matrices, the selecting pins being shiftable into coöperative relation with the arresting pins to set the latter accordingly, and means releasable by the shifting movement of the matrix selecting pins for positioning the matrix carriers in coöperative relation with the arresting pins.

16. In a machine of the class described, the combination of a plurality of matrix carriers each bearing a plurality of fonts of matrices and having a set of stops of graduated lengths projecting therefrom, arresting pins adapted to be projected different distances to coöperate with any one of said stops, keyboard actuated mechanism for projecting the arresting pins, and means for adjusting said mechanism whereby the same will project the arresting pins different distances according to the font in use.

In testimony whereof I have hereunto set my hand in presence of two subscribing witnesses.

BAYLUS CADE.

Witnesses:
  C. A. BATEMAN,
  THOMAS L. JENKINS.